United States Patent

Schmalz et al.

[11] Patent Number: 6,039,530
[45] Date of Patent: Mar. 21, 2000

[54] VACUUM MANIPULATION DEVICE

[75] Inventors: Kurt Schmalz; Wolfgang Schmalz, both of Dornstetten; Thomas Eisele, Fluorn-Winzeln, all of Germany

[73] Assignee: J. Schmalz GmbH, Glatten, Germany

[21] Appl. No.: 09/289,968

[22] Filed: Apr. 13, 1999

[30] Foreign Application Priority Data

Apr. 21, 1998 [DE] Germany .................. 198 17 754

[51] Int. Cl.$^7$ ...................................... B66C 1/02
[52] U.S. Cl. .................. 414/627; 414/737; 414/752; 294/64.1; 901/40; 271/103
[58] Field of Search ..................... 414/627, 737, 414/752; 901/40; 294/64.1; 271/94, 96, 103

[56] References Cited

U.S. PATENT DOCUMENTS

| | | | |
|---|---|---|---|
| 3,734,325 | 5/1973 | Stone | 294/64.1 X |
| 3,785,691 | 1/1974 | Sperry | 294/64.1 |
| 3,933,388 | 1/1976 | Conboy | 294/64.1 |
| 4,413,853 | 11/1983 | Andersson | 294/64.1 |
| 4,557,659 | 12/1985 | Scaglia | 414/627 |
| 4,858,976 | 8/1989 | Stoll | 294/64.1 |
| 5,221,117 | 6/1993 | Messinger et al. | 414/627 X |
| 5,330,314 | 7/1994 | Bennison | 414/627 |
| 5,375,895 | 12/1994 | Volkert | 294/64.1 |
| 5,431,469 | 7/1995 | Ohno et al. | 414/627 X |
| 5,816,635 | 10/1998 | Jansson | 414/627 X |

FOREIGN PATENT DOCUMENTS

WO 96/03602  2/1996  WIPO .

*Primary Examiner*—Robert P. Olszewski
*Assistant Examiner*—Gerald J. O'Connor
*Attorney, Agent, or Firm*—Jones, Tullar & Cooper, P.C.

[57] ABSTRACT

A vacuum manipulation device with a lifter hose, which can be connected to a vacuum-generating device, and with a suction gripper device, which can be placed on an object to be manipulated, by means of which the object can be drawn-up and, by contracting the lifter hose, can be lifted. In order to prevent the suction gripper device from snapping upward in case of an unintentional release of a drawn-up object, the manipulation device features a weight-actuable regulating element which, under the effect of the weight of an object drawn by suction against the suction side of the suction gripper device, blocks a flow cross section into the interior of the lifter hose, and unblocks it in the unoccupied state of the suction gripper device.

7 Claims, 5 Drawing Sheets

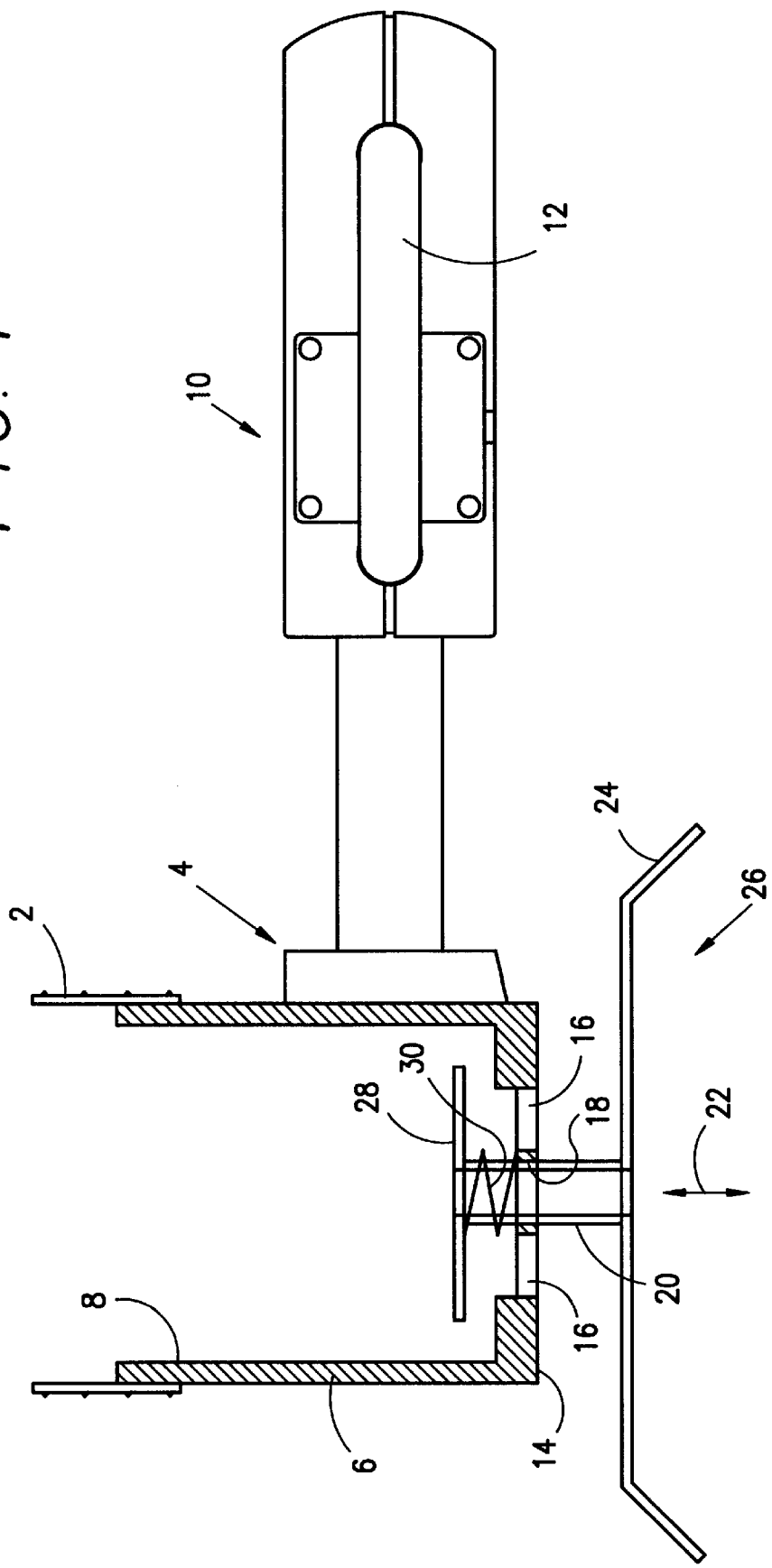

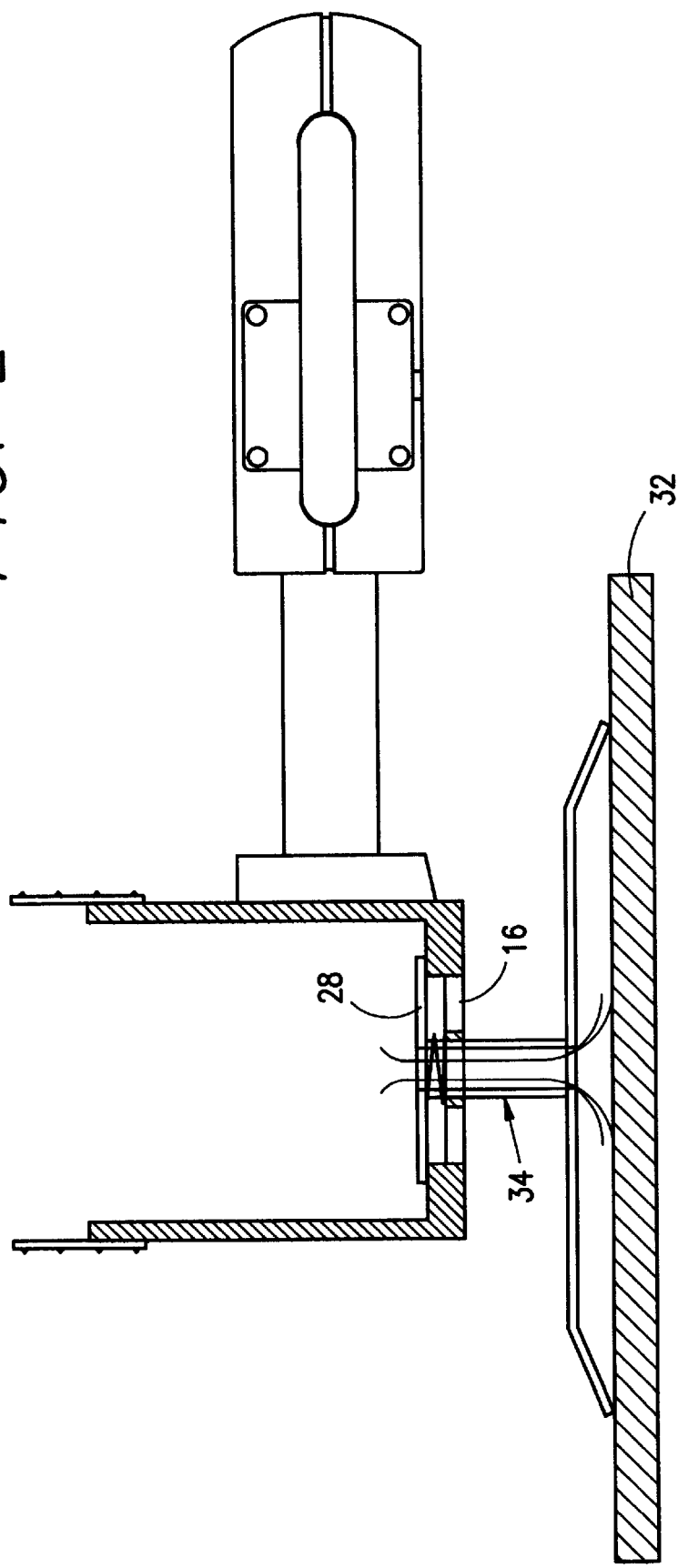

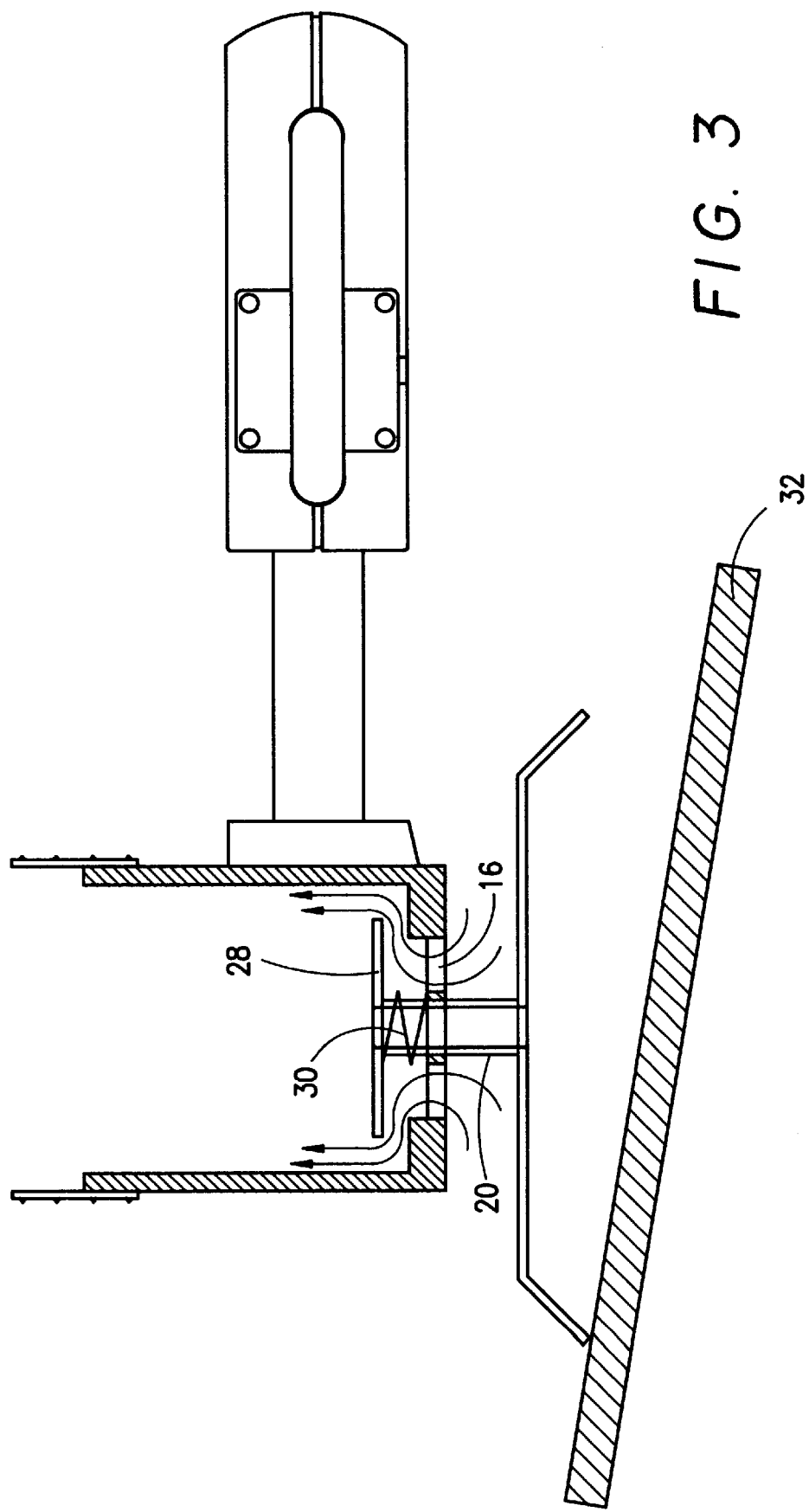

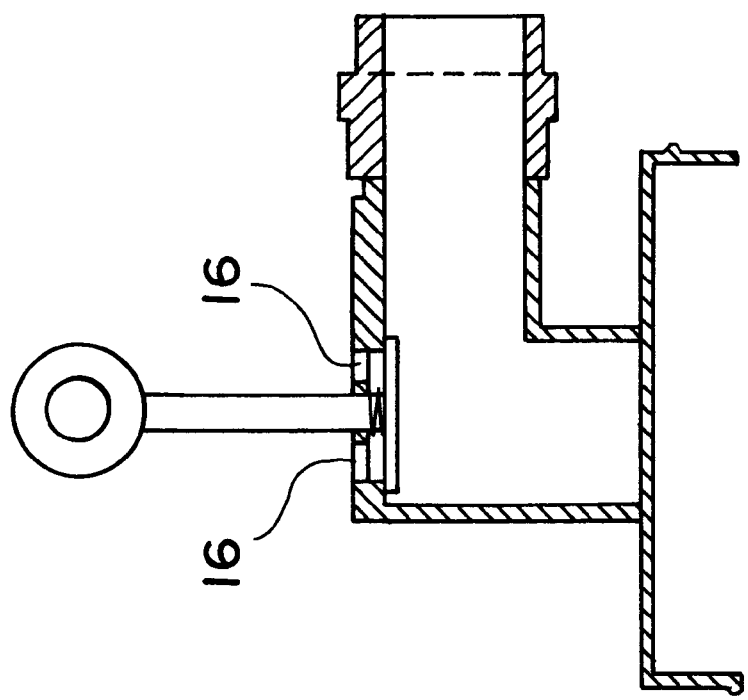
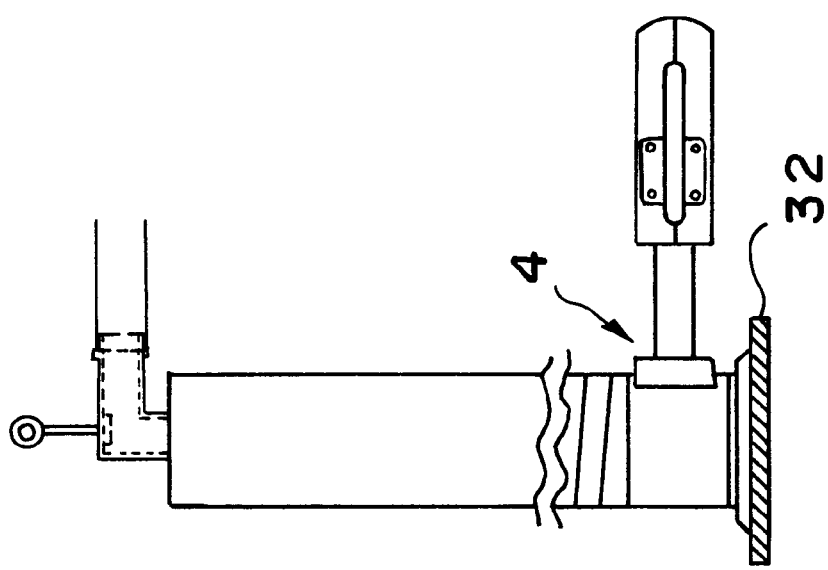

VACUUM MANIPULATION DEVICE

FIELD OF THE INVENTION

The present invention relates to a vacuum manipulation device, having a lifter hose, which can be connected to a vacuum-generating device, and a suction gripper device, which can be placed on the object to be manipulated and with which the object can be drawn-up by suction and lifted by contracting the lifter hose.

BACKGROUND OF THE INVENTION

Vacuum manipulation devices of the above type are known, which have one or several feeler rods on the suction side of the suction gripper device which, when placed on an object, are pushed inward and in the process unblock a flow cross section by means of which the object can be drawn-up by suction. However, if the object is inadvertently released, for example because a cardboard package is torn, the feeler rod, which is prestressed by a spring, is immediately moved into the closing position. There is the danger that the suction gripper device is abruptly accelerated upward and in the course of this acceleration injures an operator.

SUMMARY OF THE INVENTION

Based upon the above, it is an object of the present invention to provide a vacuum manipulation device of the type described at the outset in such a way that, when a lifted object is inadvertently released, the upward snapping of the suction gripper device is prevented.

In connection with a vacuum manipulation device in accordance with the present invention, this object is attained by means of a regulating element actuated by weight, which blocks a flow cross section into the interior of the lifter hose by means of the action of the weight of an object drawn-up by suction against the suction side of the suction gripper device, and unblocks it again in the unoccupied state of the suction gripper device. This is not the flow cross section by means of which the object is drawn-up by suction against the suction gripper device, but a further ventilation or flow opening of the suction gripper device or of the lifter hose, which is unblocked in the unoccupied state of the suction gripper device and in this way limits the vacuum inside the lifter hose.

In accordance with the proposal of the present invention, the regulating element is actuated by the weight of a drawn-up object when this object is lifted, and the flow cross section is blocked in the process, so that the greatest possible suction output is available for lifting the object. If the object is inadvertently released, the weight is reduced and the regulating element is brought into its initial position, in which it unblocks the flow cross section into the interior of the lifter hose. A sufficient amount of air can flow through this additional flow cross section into the interior of the lifter hose to prevent the undesired upward snapping of the suction gripper device by means of the contraction of the lifter hose.

In accordance with an embodiment of the present invention the regulating element constitutes a suspension of the lifter hose, wherein this is also a rotary suspension in an advantageous manner.

In a further embodiment of the present invention, the regulating element is prestressed by a spring and supports a suction gripper or suction plate, which constitutes the suction end and can be placed on the object to be lifted.

With the object drawn against the suction gripper device and lifted, the regulating element is actuated in both cases by means of the weight of the object in such a way that the flow cross section into the interior of the lifter hose is blocked, and is unblocked in the unoccupied state.

The weight-actuated regulating element could be made in any arbitrarily complicated manner with the use of force sensors and the employment of electromagnetic actuation means. In a particularly simple and therefore advantageous manner the regulating element contains a plunger, which is prestressed by a spring and can be moved back and forth in the vertical direction in accordance with the weight acting on it.

A closing element could be indirectly actuated in an arbitrary manner known per se by the regulating element in accordance with the position of the regulating element. However, it has been found to be particularly advantageous if the regulating element itself supports a valve plate and blocks or unblocks the flow cross section into the interior of the lifter hose by means of this valve plate.

In an advantageous manner, the regulating element extends into the interior of the vacuum manipulating device and has the above mentioned valve plate on its interior, wherein a spring can be supported between the valve plate and a wall of the manipulating device and in this way attempts to lift the valve plate away from the wall. If the regulating element is stressed toward the exterior because of the weight of a drawn-up object, the valve plate is sealingly placed from the interior against a flow opening in the wall and the flow cross section is blocked.

If, as mentioned at the outset, the regulating element supports the suction gripper or suction plate which can be placed on the object, the suction gripper could be connected with the interior of the suction gripper device by means of an additional means constituting a hose, for example a flexible hose. However, it has been found to be advantageous if the suction gripper communicates via the interior of the regulating element with the suction gripper device, or respectively the lifter hose and therefore with the device generating the vacuum. In this case the regulating element is designed approximately in the shape of a sleeve.

Further characteristics, details and advantages of the present invention ensue from the drawing representation and following description of two preferred embodiments of the vacuum manipulation device in accordance with the present invention.

BRIEF DESCRIPTION OF THE DRAWINGS

FIG. 1 represents a first embodiment of a vacuum manipulation device in accordance with the present invention in the unoccupied state;

FIG. 2 represents the vacuum manipulation device in FIG. 1 with a drawn-up object;

FIG. 3 represents the vacuum manipulation device in FIG. 2 with an object coming loose;

FIGS. 5a and 5b represent the vacuum manipulation device in FIGS. 4a and 4b with a drawn-up object.

DESCRIPTION OF THE PREFERRED EMBODIMENTS

Figure 4B:
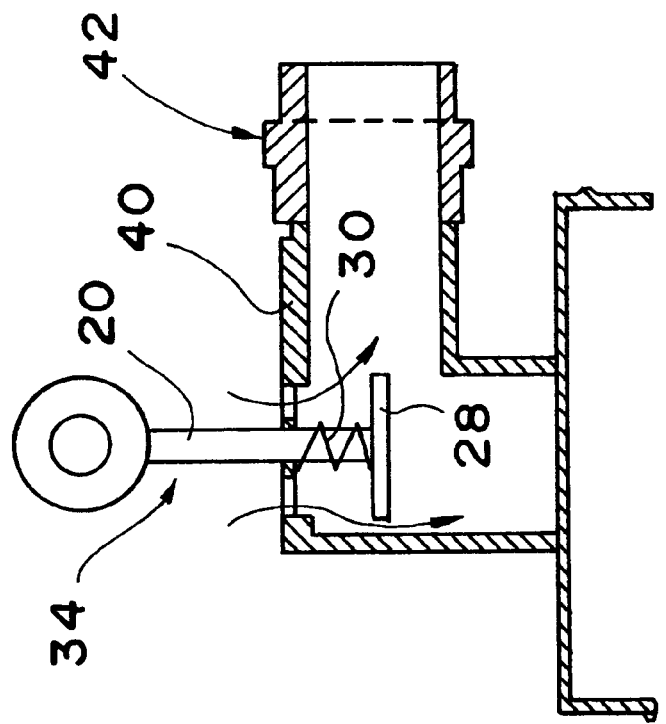
FIGS. 4a and 4b represent a further embodiment of the vacuum manipulation device in accordance with the present invention in the unoccupied state.

FIGS. 1 to 3 represent a vacuum manipulation device with a lifter hose 2, which is only sketched in, and a suction gripper device, identified as a whole by the reference numeral 4. The suction gripper device 4 comprises a base body 6, on whose cylinder-shaped connecting flange 8 the lifter hose 2 is fastened in a releasable and vacuum-tight manner. A manually actuable operating unit 10 with several handles 12 is fastened on the base body 6.

The base body 6 comprises a bottom 14 with flow openings 16 and a passage 18, in which a plunger 20 is received, slidingly displaceable in the set-down direction 22. The plunger 20 has a schematically represented suction gripper 24, which can be set on an object to be lifted or on any arbitrary object and which constitutes a draw-up side 26 of the suction gripper device 4. The plunger 20 extends through the opening 18 into the interior of the base body 6 and supports on its inner front end a valve plate 28, which extends in the plane perpendicular with respect to the longitudinal axis of the plunger and the set-down direction 22. A helical compression spring 30 is provided between the valve plate 28 and the inside of the bottom 14 of the base body 6, which concentrically surrounds the plunger 20 and prestresses it in the direction toward the inside.

The plunger 20 is hollow on the inside and constitutes a flow connection between the suction gripper 24 and the interior of the base body 6, or respectively of the lifter hose 2. If, as represented in FIG. 2, the suction gripper device 4 is set on an object 32, the object is drawn-up to the suction gripper 24 via the interior of the plunger 20. If the suction gripper device 4 is lifted, the plunger 20 is moved outward against the prestress by the spring 30 because of the weight of the workpiece 32, until the valve plate 28 rests against the inside of the bottom 14 of the base body 6 and in this way blocks the flow openings 16, so that the entire available suction output of the vacuum-generating device can be used for lifting the object 32.

If, as represented in FIG. 3, the object 32 is inadvertently released, the plunger 20 and therefore the valve plate 28 are immediately brought into their initial position represented in FIGS. 1 and 3, in which the valve plate 28 unblocks the flow openings 16 so that sufficient air can flow into the interior of the vacuum manipulation device to prevent the suction gripper device 4 from snapping upward. Thus, the plunger 20 acts as a weight-actuated regulating element 34 which blocks a flow cross section into the interior of the lifter hose because of the effect of the weight of a drawn-up object, or respectively unblocks the suction gripper device in the unoccupied state.

Figure 4A:
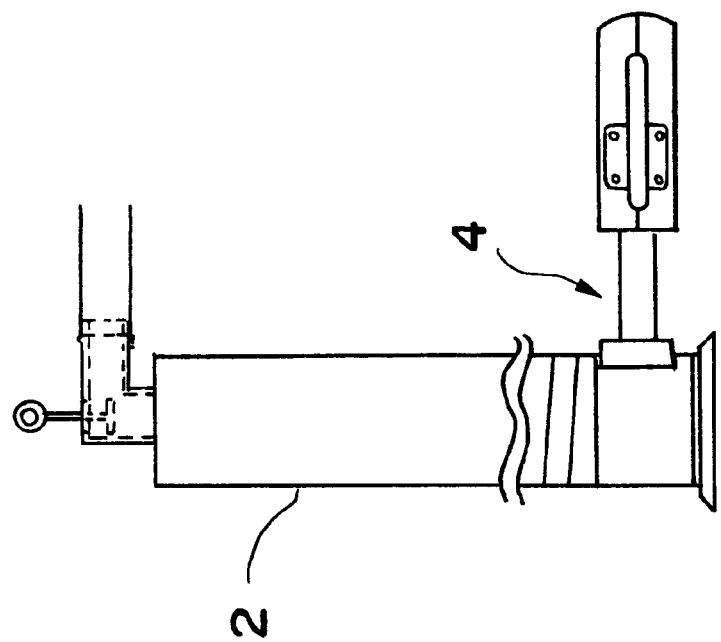

FIGS. 4a, 4b and 5a, 5b represent a further embodiment of a vacuum manipulation device with a lifter hose 2 and a suction gripper device 4. In this embodiment a weight-actuated regulating element 34 constitutes a rotatable suspension of the vacuum manipulation device. As with the exemplary embodiment of FIGS. 1 to 3, the regulating element 34 comprises a plunger 20 which in this case, however, extends through the wall 40 of an angle piece, which couples the end of the lifter hose 2 remote from the suction gripper with a connector 42 of a hose, which thereafter leads to the vacuum-generating device, not represented. The plunger 20 again has a valve plate 28 on the inside and is prestressed toward the inside by a compression spring 30. If, as represented in FIGS. 5a, 5b, an object 32 is drawn-up against the suction gripper device 4 and is lifted by the latter, the compression spring 30 is compressed by the effect of the weight of the object 32, so that the valve plate 28 comes to rest against the inside of the wall 40 and closes the flow openings 16 provided there. If the object 32 should be inadvertently released (not represented), the spring 30 will move the plunger 20 inward because of the weight reduction, and by means of this a flow cross section is unblocked via the flow openings 16, which prevents the unwanted upward snapping of the suction gripper device 4.

We claim:

1. A vacuum manipulation device, comprising:

a suction gripper device for placement on an object to be manipulated and for drawing-up the object to be manipulated by suction, said suction gripper device defining a flow cross section into its interior; and a lifter hose connected to a vacuum-generating device and to said suction gripper device for communicating with the interior of said suction gripper device, wherein:

said suction gripper device includes a weight-actuated regulating element;

said weight-actuated regulating element blocks said flow cross section under the influence of the weight of the object drawn by suction against the suction side of said suction gripper device, and unblocks said flow cross section in the unoccupied state of said suction gripper device.

2. The vacuum manipulating device as defined in claim 1, wherein said suction gripper device constitutes a suspension for said lifter hose.

3. The vacuum manipulating device as defined in claim 1, wherein said suction gripper device further includes a spring which prestresses said weight-actuated regulating element.

4. The vacuum manipulating device as defined in claim 3, wherein said weight-actuating regulating element comprises a plunger which is prestressed by said spring and which can be moved back and forth.

5. The vacuum manipulating device as defined in claim 4, wherein said weight-actuating regulating element includes a valve plate, with which it blocks or unblocks said flow cross section.

6. The vacuum manipulating device as defined in claim 5, wherein said valve plate is sealingly placed, from the inside, against a flow opening in the housing wall of said suction gripper device.

7. The vacuum manipulating device as defined in claim 1, wherein said suction gripper device also includes a suction gripper which communicates via the interior of said weight-actuating regulating element with said lifter hose, and therefore with said vacuum-generating device.

* * * * *